(12) United States Patent
Lehrer (10) Patent No.: US 8,868,227 B2
(45) Date of Patent: Oct. 21, 2014

(54) SYSTEM AND METHOD FOR ALIGNING DESIGN ELEMENTS ON A GARMENT

(71) Applicant: R.B. III Associates Inc, San Marcos, CA (US)

(72) Inventor: Matthew Lehrer, Carlsbad, CA (US)

( * ) Notice: Subject to any disclaimer, the term of this patent is extended or adjusted under 35 U.S.C. 154(b) by 123 days.

(21) Appl. No.: 13/736,042

(22) Filed: Jan. 7, 2013

(65) Prior Publication Data

US 2014/0195203 A1    Jul. 10, 2014

(51) Int. Cl.
  *G06F 19/00* (2011.01)
  *A41H 3/00* (2006.01)
  *G06F 17/50* (2006.01)

(52) U.S. Cl.
  CPC .............. *G06F 17/50* (2013.01); *A41H 3/007* (2013.01)
  USPC ........................................................ 700/132

(58) Field of Classification Search
  USPC ................ 700/130–138; 112/102.5, 470.01, 112/470.04, 470.06, 475.18, 475.19; 705/27.2
  See application file for complete search history.

(56) References Cited

U.S. PATENT DOCUMENTS

| | | | | |
|---|---|---|---|---|
| 4,926,344 A | * | 5/1990 | Collins et al. | 700/132 |
| 5,943,972 A | * | 8/1999 | Hirata | 112/102.5 |
| 6,123,040 A | * | 9/2000 | Hayakawa et al. | 112/445 |
| 6,301,518 B1 | * | 10/2001 | Kawaguchi | 700/131 |
| 6,907,310 B2 | * | 6/2005 | Gardner et al. | 700/132 |
| 6,925,350 B2 | * | 8/2005 | Watanabe | 700/132 |
| 7,058,471 B2 | * | 6/2006 | Watanabe | 700/132 |
| 2005/0240416 A1 | * | 10/2005 | Schindler et al. | 705/1 |

* cited by examiner

*Primary Examiner* — Nathan Durham
(74) *Attorney, Agent, or Firm* — James M. Smedley LLC; James M Smedley (57) ABSTRACT

The present invention relates generally to garment design. In particular, embodiments of the present invention are directed to systems and methods configured to assist a garment designer in applying graphics and artwork across the seams of a garment.

10 Claims, 5 Drawing Sheets

SYSTEM AND METHOD FOR ALIGNING DESIGN ELEMENTS ON A GARMENT

FIELD OF THE INVENTION

The present invention relates generally to garment design. In particular, embodiments of the present invention are directed to systems and methods configured to assist a garment designer in applying graphics and artwork across the seams of a garment.

BACKGROUND

Currently, apparel designers face a number of challenges when creating garment patterns that will be used to manufacture a new article of clothing. Many of these issues relate to inherent challenges that arise when a designer goes between the two-dimensional ("2D") environments of a drawing board, computer screen, or flat-cut pattern pieces to the fully assembled three-dimensional ("3D") article of clothing. In particular, apparel designers encounter difficulties when a design element, such as a graphic or piece of artwork, is placed across a seam of a garment. The main issue in placing a design element over a seam of a garment is ensuring that the design elements stays aligned as it crosses the seam.

Historically, when a design element is going to cross a seam, a designer must measure and align that design element by hand. This is a very precise and time consuming process involving multiple steps to ensure that the design element aligns properly across the seam. The process requires a designer to align a design element as desired and then cut the design element into two or more pieces so that it can cross the seam properly. The cut made by the designer, however, does not simply consists of the designer cutting one design element in half. Instead, the designer must use 2 or more duplicates of the design element. This is because the designer must factor in an allowance, or an extra amount of material, that is added to each piece of the various parts of the design element so that when the seam is sewn during manufacturing, all of the parts of the design element come together to form a single and properly aligned image that is identical to the intended design element. Overall, the process is manually intensive and can require a trial and error process for even the most expertly skilled designers.

Therefore, there is a need in the art for a system and a method for determining an allowance for a design element of a garment so that the design element will be properly aligned across the seams of that garment. These and other features and advantages of the present invention will be explained and will become obvious to one skilled in the art through the summary of the invention that follows.

SUMMARY OF THE INVENTION

Accordingly, it is an aspect of the present invention to provide a system and method for determining an allowance for a design element and applying and properly aligning that design element across the seams of a garment for the purpose of apparel design and manufacturing.

According to an embodiment of the present invention, a system for aligning design elements across the seams of a garment, the system comprising: a seam allowance module comprising physical memory storing instructions that cause the seam allowance module to: provide a user interface to a user, receive design input from the user, wherein the user places a digital representation of a design element on a digital representation of a garment, align the digital representation of a design element across a seam in the digital representation of a garment, divide the digital representation of a design element across the seam of the digital representation of a garment, wherein in the digital representation of a design element is split into two or more design element parts, and determine an allowance for the two or more design element parts; wherein the allowance is an amount of material added to the two or more design element parts to ensure proper alignment across the seam during garment assembly.

According to an embodiment of the present invention, the system further includes a communications means, wherein the communications means allows the user to utilize the seam allowance module through a computer network.

According to an embodiment of the present invention, the system further includes a data store, wherein the data store comprises one or more seam allowances that are added to the two or more design element parts.

According to an embodiment of the present invention, the physical memory storing instructions further cause the seam allowance module to generate a design element pattern for the two or more design element parts.

According to an embodiment of the present invention, the system further includes a printing means, wherein the design element pattern is printed onto a physical medium via the printing means.

According to an embodiment of the present invention, a method for aligning design elements across the seams of a garment, the method comprising the steps of: providing a user interface to a user via a seam allowance module, receiving design input from the user, wherein the user places a digital representation of a design element on a digital representation of a garment, aligning the digital representation of a design element across a seam in the digital representation of a garment, dividing the digital representation of a design element across the seam of the digital representation of a garment, wherein in the digital representation of a design element is split into two or more design element parts, and determining an allowance for the two or more design element parts, wherein the allowance is an amount of material added to the two or more design element parts to ensure proper alignment across the seam during garment assembly.

According to an embodiment of the present invention, the method may include the step of providing a communications means for the user to utilize the seam allowance module over a computer network.

According to an embodiment of the present invention, the method may include the step of providing a data store for the user to access one or more seam allowances to be applied to the two or more design element parts.

According to an embodiment of the present invention, the method may include the step of generating a design element pattern via a printing means.

According to an embodiment of the present invention, the method may include the step of printing the design element pattern onto a physical medium via a printing means.

DETAILED SPECIFICATION

The present invention relates generally to garment design. In particular, embodiments of the present invention are directed to systems and methods configured to assist a garment designer in applying graphics and artwork across the seams of a garment.

Figure 1:
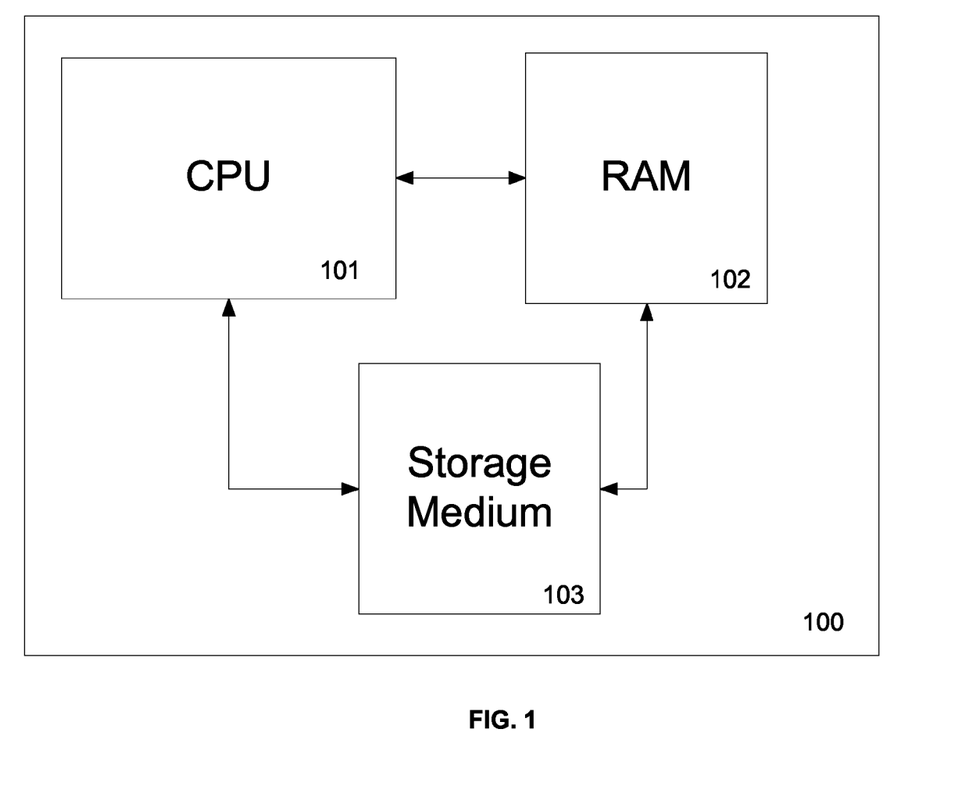
FIG. 1 illustrates a schematic overview of a computing device, in accordance with an embodiment of the present invention.

According to an embodiment of the present invention, the system and method is accomplished through the use of one or more computing devices. As shown in FIG. 1, one of ordinary skill in the art would appreciate that a computing device 100 appropriate for use with embodiments of the present application may generally be comprised of one or more of a Central processing Unit (CPU) 101, Random Access Memory (RAM) 102, and a storage medium (e.g., hard disk drive, solid state drive, flash memory, cloud storage) 103. Examples of computing devices usable with embodiments of the present invention include, but are not limited to, personal computers, smart phones, laptops, mobile computing devices, tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
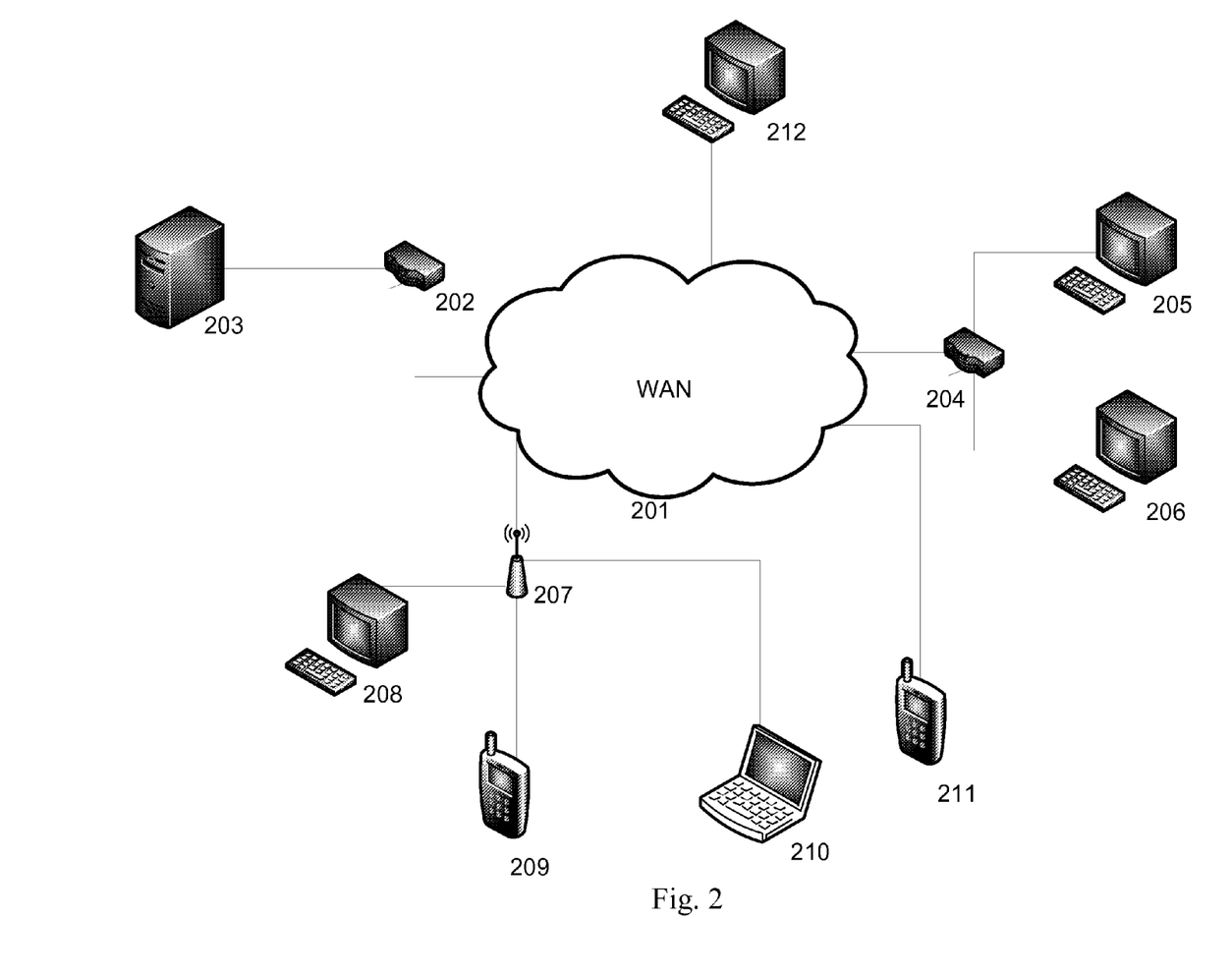
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, the system and methods herein described may be implemented through the use of a seam allowance module. The seam allowance module is configured to align a design element across the seam of a garment and calculate how much of an allowance must be left on the design element to ensure proper alignment during the manufacturing of the garments. The design elements may include, but are not limited to, graphics, artwork, lettering, stripes, and other patterns. The seam allowance module will calculate how the design elements should be cut and aligned before final garment assembly. The seam allowance module may also be capable of creating patterns that would be used in the manufacturing of the design elements.

Figure 3:
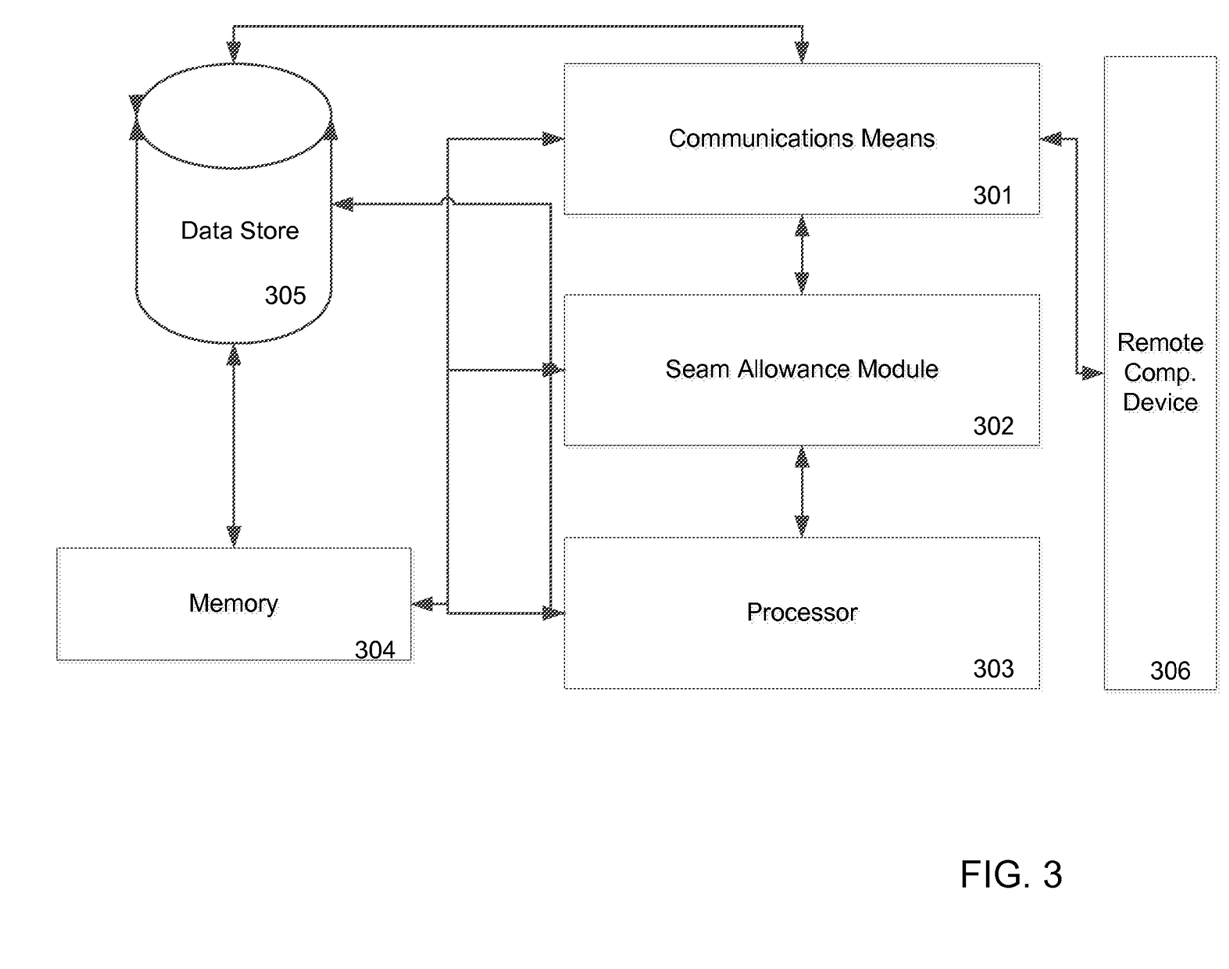
FIG. 3 is a schematic of an exemplary embodiment of a web-based system for aligning design elements on a garment.

Turning now to FIG. 3, an exemplary embodiment of a system for aligning design elements on a garment is shown. In this embodiment, the graphic alignment engine includes a communications means 301, a seam allowance module 302, a processor 303, a non-transitory memory module 304 and a data store 305. In this embodiment, the seam allowance module 302 works in conjunction with the processor 303, memory 304, data store 305 and communications means 301 to align a design element across the seam of garment for a remote computing device 306. This is a web-based system model, whereby the system provides processing functionality for a remote user by processing requests received from the user based on inputs received from the user. While the embodiment shown in FIG. 3 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the communications means of the graphic alignment engine may be, for instance, any means for communicating data over one or more networks. Appropriate communications means may include, but are not limited to, wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

Figure 4:
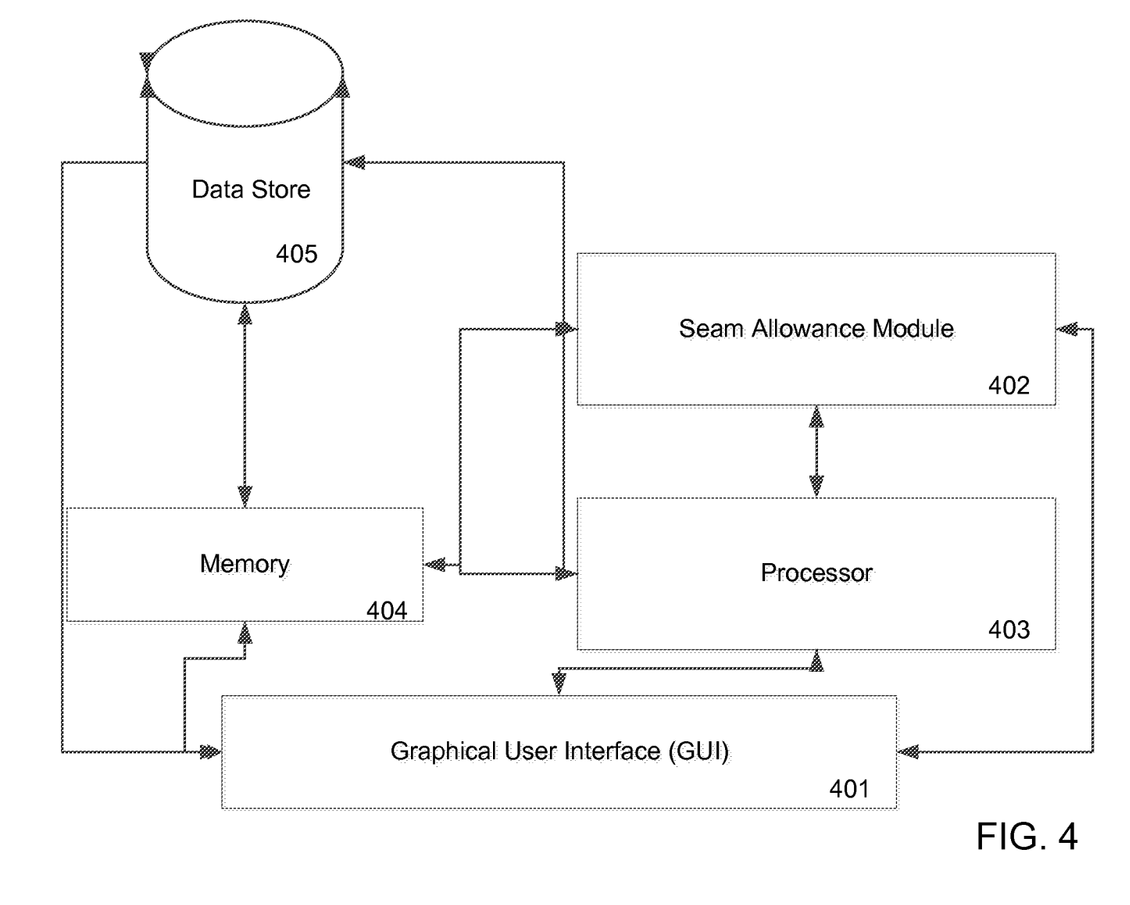
FIG. 4 is a schematic of an exemplary embodiment of a local system for aligning design elements on a garment.

Turning now to FIG. 4, another exemplary embodiment of a system for aligning design elements on a garment is shown. In this embodiment, the system is provided for on a single computing device, with a graphical user interface (GUI) 401 replacing the communications means 301 of FIG. 3 for communications with a user. Similar to the previously described embodiment, the system is comprised of a seam allowance module 402, a processor 403, a non-transitory memory module 404 and a data store 405. In this embodiment, the seam allowance module 402 works in conjunction with the processor 403, memory 404, data store 405 and GUI 401 to align a design element across the seam of garment for a computing device operated by the user. This is a local system model, whereby the system is generally provided on a single computing device or clustered computing device configured to receive inputs from the user. While the embodiment shown in FIG. 4 is an exemplary embodiment, other embodiments may include additional or fewer components. One of ordinary skill in the art would appreciate that there are numerous configurations of the components that could be utilized with embodiments of the present invention, and embodiments of the present invention are contemplated for use with any configuration of components.

According to an embodiment of the present invention, the seam allowance module may be comprised of computer-executable code stored in non-transitory memory and configured to instruct a processing means (e.g., CPU) to process the computer-executable code in order to perform the desired functionality described herein. The seam allowance module is configured to receive one or more files from one or more sources. The files contain various garment designs and patterns, as well as any number of design element patterns. The sources providing the files to the seam allowance module may include, but are not limited to, submission from a user, provided from a data store (e.g., database, storage medium, cloud storage, image provider) or any combination thereof. One of ordinary skill in the art would appreciate that there are numerous manners in which the seam allowance module may receive the garment and design element pattern files.

According to an embodiment of the present invention, the seam allowance module is configured to utilize the garment and design element pattern files to align one or more design elements across one or more seams of a garment. The seam allowance module may receive input from the multiple sources including, but not limited to, a user and a data store. In a preferred embodiment, the user could provide input regarding the placement of a design element on a garment. The data store could provide input to the seam allowance module that includes, but is not limited to pattern designs, design element layouts, seam lines, flat-cut cut patterns, garment production components, and manufacturing tolerances and allowances. One of ordinary skill in the art would appreciate that there are numerous types of information and inputs that could be utilized by embodiments of the seam allowance module, and embodiments of the present invention are contemplated for use with any type of information and/or inputs.

According to an embodiment of the present invention, the seam allowance module is configured to calculate an allowance, which is an extra amount of material that is added to a design element to ensure the design element aligns properly across a seam during the manufacturing of the garment. In a preferred embodiment, the seam allowance module would calculate an allowance when there is a design element that has been place across a seam of the garment. The seam allowance would calculate where there design element needs to be split and how many pieces the design element should be split into. The seam allowance module may then add an allowance to each piece of the design element to ensure that the design element will be properly aligned when added to the garment during the manufacturing process.

In certain embodiments of the present invention, the amount of seam allowance may be calculated by the seam allowance module based at least in part on factors associated with the particular type of seam or garment. For instance, the user may be able to identify to the seam allowance module that the seam in question is associated with a men's medium size t-shirt. In process, the seam allowance module may be configured to identify the particular seam allowance based upon one or more of the type of garment, the size of a garment, the gender or fit of a garment (e.g., men, women, girl, toddler, infant, petite, big and tall) or any combination thereof. One of ordinary skill in the art would appreciate that there are numerous methods that could be utilized by the seam allowance module for determining the exact seam allowance for a particular garment, and embodiments of the present invention are contemplated for use with any method for determining a seam allowance for a particular garment. In other embodiments, a user may be able to provide exact seam size or overlap to the seam allowance module for the purpose of the seam allowance calculation.

According to an embodiment of the present invention, the seam allowance module is configured to provide a user interface. The user interface would enable a user to see a digital representation of how a design element looks when applied to a garment. Specifically, the user interface would allow the user to move design element around on a garment and view the alignment of a design element when it crosses the seam of a garment. Additionally, the user interface may show digital representations of the various pattern pieces that would be used in manufacturing and assembly of a garment.

According to an embodiment of the present invention, the seam allowance module may be configured to provide garment and design element patterns for the various components used to manufacture and assemble a finished garment. In a preferred embodiment, the patterns would be generated based upon inputs from sources the user, a data store, or any combination thereof. When garment design has been finished, the seam allowance module may break down the garment and design element(s) into its component pieces and generate patterns that will be used to manufacture the various components of that garment. These components, when assembled, would create a finished garment.

Exemplary Embodiments

Figure 5:
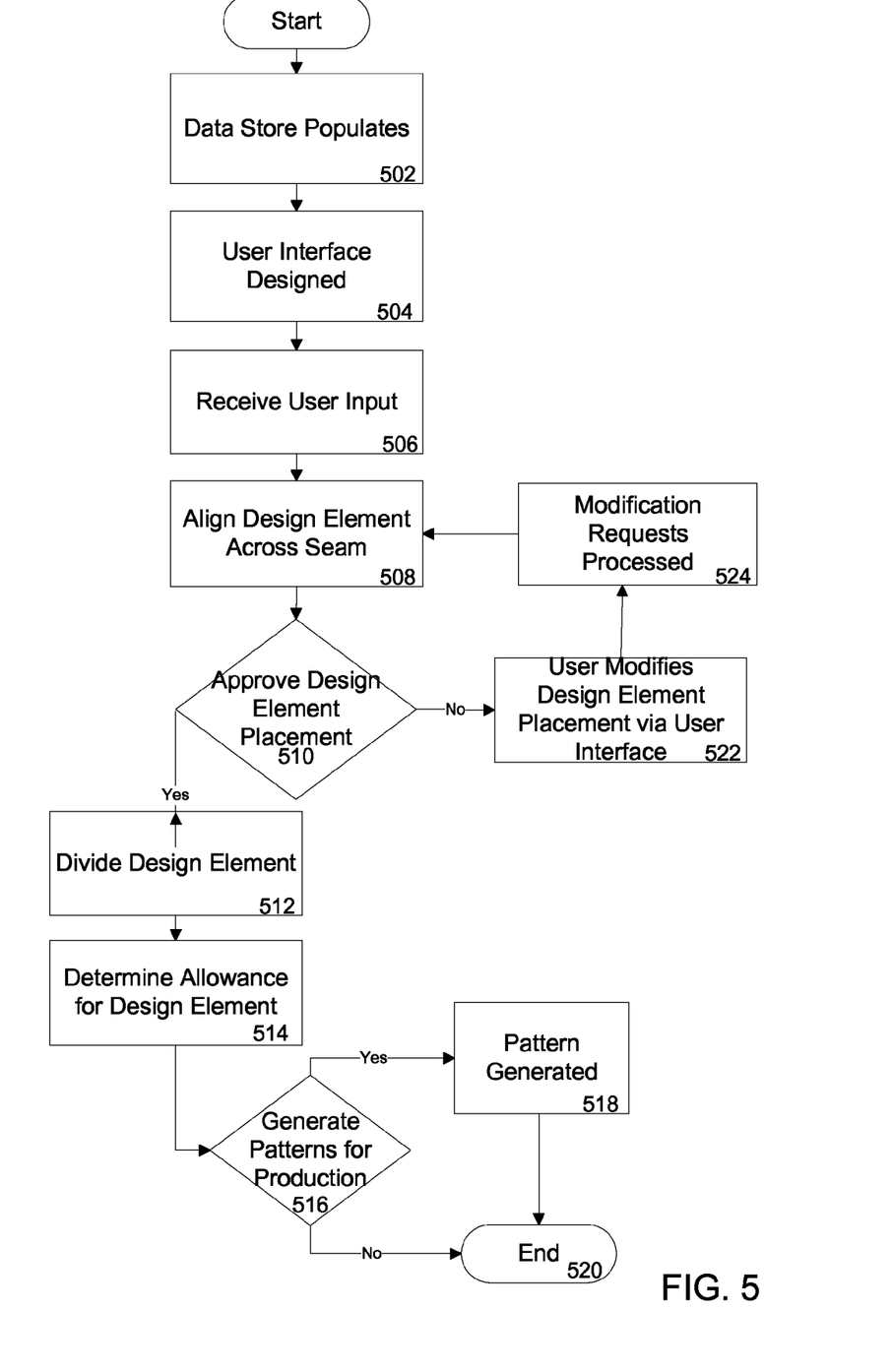
FIG. 5 is a flowchart of an exemplary method in accordance with an embodiment of the present invention.

The following is an exemplary embodiment of a method for utilization of the graphic alignment engine, as shown in FIG. 5. At step 500, the process starts with a user initiating a request for aligning a design element across the seam of garment.

At step 502, the system populates a data store in response to the user initiated request. As noted above, the data store will populate with data associated with the particular request. This may include data related to garment designs, design element, seam lines, flat-cut cut patterns, garment production components, and manufacturing tolerances and allowances.

At step 504, the system generates the user interface for the request. In generation of the user interface, the system creates a graphical representation of a garment.

At step 506, the user applies a design element to the garment generated on the user interface. In certain embodiments, the user may be provided the ability to add other design elements at later points in the process as well if so desired.

At step 508, the system aligns the design element based on the input from the user and the information populated into the data store. Alignment of the design element is done through the use of the seam allowance module.

At step 510, the garment is presented to the user for review and the user determines the acceptability of the alignment of the design element. If the alignment is approved, the system proceeds to step 512 and the design element is divided into two or more pieces so that the design element can cross the seam in the garment. If the alignment is not approved, the system proceeds to step 522.

At step 514, the seam allowance module calculates an allowance to be added to each piece of the design element. The allowance is an amount of material added to each piece of the design element so that the design element will be properly aligned across the seam of the garment when the garment is assembled during the manufacturing process.

At step 516, the user determines whether or not to generate patterns to be used in the production and assembly of the finalized version of the garment. If the user wishes to create patterns, the system proceeds to step 518 and production patterns are generated. These patterns may be used to make duplicates of the various components of the garment to be used in the mass production of that garment. The patterns may include, but are not limited to, patterns for the pieces of the design elements and flat-cut patterns for components of the garment. Following the generation of the production patterns or if the user does not wish to generate production patterns, the process then terminates at step 520.

At step 522, the user is provided the ability to modify or otherwise alter the placement and alignment of the design element either through direct interaction with the user interface or by requesting the system take some action through options presented to the user (e.g., auto-alignment of artwork, auto-alignment of elements).

At step 524, the modifications are processed by the seam allowance module and the process returns to step 508 for further rendering and approval by the user. This loop can continue as many times as necessary in order to get the alignment of the design element that is desired by the user.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for aligning design elements across the seams of a garment, the system comprising:
  a seam allowance module comprising physical memory storing instructions that cause the seam allowance module to:
  provide a user interface to a user;
  receive design input from said user, wherein said user places a digital representation of a design element on a digital representation of a garment;
  align said digital representation of a design element across a seam in said digital representation of a garment;
  divide said digital representation of a design element across said seam of said digital representation of a garment, wherein in said digital representation of a design element is split into two or more design element parts; and
  determine an allowance for said two or more design element parts; wherein said allowance is an amount of material added to said two or more design element parts to ensure proper alignment across said seam during garment assembly.

2. The system of claim 1 further comprising a communications means, wherein said communications means allows said user to utilize said seam allowance module through a computer network.

3. The system of claim 1 further comprising a data store, wherein said data store comprises one or more seam allowances that are added to said two or more design element parts.

4. The system of claim 1, wherein said physical memory storing instructions further cause said seam allowance module to generate a design element pattern for said two or more design element parts.

5. The system of claim 4 further comprising a printing means, wherein said design element pattern is printed onto a physical medium via said printing means.

6. A method for aligning design elements across the seams of a garment, the method comprising the steps of:
- providing a user interface to a user via a seam allowance module;
- receiving design input from said user, wherein said user places a digital representation of a design element on a digital representation of a garment;
- aligning said digital representation of a design element across a seam in said digital representation of a garment;
- dividing said digital representation of a design element across said seam of said digital representation of a garment, wherein in said digital representation of a design element is split into two or more design element parts; and
- determining an allowance for said two or more design element parts; wherein said allowance is an amount of material added to said two or more design element parts to ensure proper alignment across said seam during garment assembly.

7. The method of claim 6, further comprising the step of providing a communications means for said user to utilize said seam allowance module over a computer network.

8. The method of claim 6, further comprising the step of providing a data store for said user to access one or more seam allowances to be applied to said two or more design element parts.

9. The method of claim 6, further comprising the step of generating a design element pattern via a printing means.

10. The method of claim 9, further comprising the step of printing said design element pattern onto a physical medium via a printing means.

* * * * *